US008953097B2

(12) United States Patent
Iketani

(10) Patent No.: US 8,953,097 B2
(45) Date of Patent: Feb. 10, 2015

(54) MOTION VECTOR ESTIMATION DEVICE, MOTION VECTOR ESTIMATION METHOD, AND PROGRAM FOR ESTIMATING MOTION VECTOR

(71) Applicant: Akihiko Iketani, Tokyo (JP)

(72) Inventor: Akihiko Iketani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/358,583

(22) PCT Filed: Oct. 25, 2012

(86) PCT No.: PCT/JP2012/077554
§ 371 (c)(1),
(2) Date: May 15, 2014

(87) PCT Pub. No.: WO2013/073355
PCT Pub. Date: May 23, 2013

(65) Prior Publication Data
US 2014/0327820 A1    Nov. 6, 2014

(30) Foreign Application Priority Data

Nov. 15, 2011   (JP) .................................. 2011-249679

(51) Int. Cl.
*H04N 7/01*         (2006.01)
*H04N 5/14*         (2006.01)

(52) U.S. Cl.
CPC .............. *H04N 5/145* (2013.01); *H04N 7/012* (2013.01); *H04N 7/014* (2013.01)
USPC ......................................... 348/452; 348/699

(58) Field of Classification Search
USPC ................. 348/699, 448, 451, 452, 458, 459; 375/240.16
IPC ...................................... H04N 7/01,11/20, 5/14
See application file for complete search history.

(56) References Cited

U.S. PATENT DOCUMENTS 6,940,557 B2 *  9/2005  Handjojo et al. .............. 348/452
8,836,860 B2 *  9/2014  Lee et al. ...................... 348/452

FOREIGN PATENT DOCUMENTS

JP          6-150007 A      5/1994
JP       2000-115585 A      4/2000

(Continued)

OTHER PUBLICATIONS

A. Bruhn et al., "Lucas/Kanade Meets Horn/Schunck: Combining Local and Global Optic Flow Methods," International Journal of Computer Vision, vol. 61, Issue 3, 2005, pp. 211-231.
M. Lee et al., "Motion Extraction of Time Varying Images Using Virtual Gradient Method", Transaction of the Institute of Systems, Control and Information Engineers, Sep. 1998, vol. 11, No. 9, pp. 483-490, with English Abstract.

(Continued)

*Primary Examiner* — Sherrie Hsia
(74) *Attorney, Agent, or Firm* — Sughrue Mion, PLLC

(57) ABSTRACT

Provided is a motion vector estimation device capable of estimating the motion vector with less computation. A motion vector estimation device for estimating, by means of repetitive calculations, the motion vector of each of a plurality of pixel groups which is contained in an input image and which each contains one or more pixels, the motion vector estimation device being provided with a means for making repetitive calculations with regard to the pixel groups that do not have a high frequency component from among the plurality of pixel groups contained in the input image after making repetitive calculations with regard to the pixel groups that have a high frequency component from among the plurality of pixel groups contained in the input image.

20 Claims, 10 Drawing Sheets

(56) References Cited

FOREIGN PATENT DOCUMENTS

| JP | 2009-88884 A | 4/2009 |
|---|---|---|
| JP | 2010-74496 A | 4/2010 |
| JP | 2011-82700 A | 4/2011 |

OTHER PUBLICATIONS

International Search Report for PCT Application No. PCT/JP2012/077554, mailed on Jan. 15, 2013.

* cited by examiner $i_1 = ratio_{high} \cdot (i_{MAX} - n)$ $i_2 = i_{MAX} - n$ HERE, ratiohigh MAY BE SET TO A PREDETERMINED VALUE (HOWEVER, ratiohigh IS IN A RANGE OF 0 TO 1), OR MAY BE A RATIO OF HIGH FREQUENCY PIXELS TO WHOLE IMAGE.

EXAMPLE OF HIGH FREQUENCY MASK IMAGE
WHITE: HIGH FREQUENCY PIXEL (EDGE)
BLACK: LOW FREQUENCY PIXEL

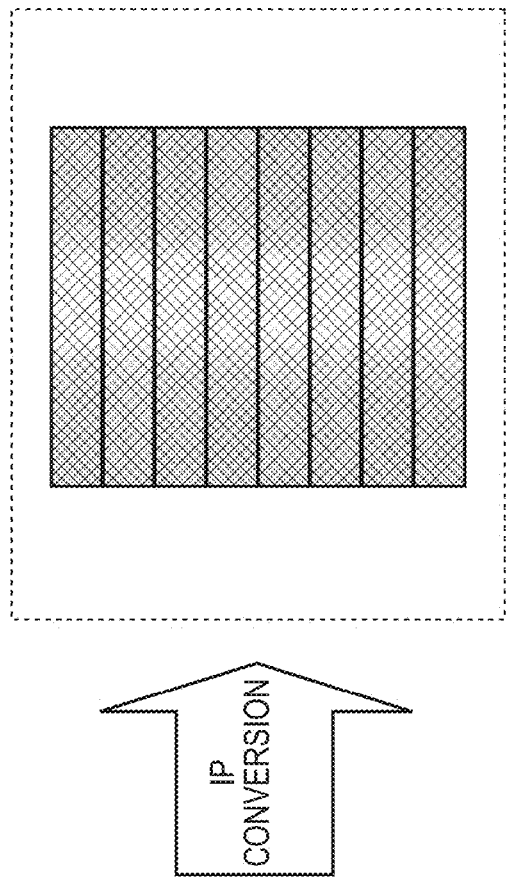
FIG. 11B
PROGRESSIVE IMAGE
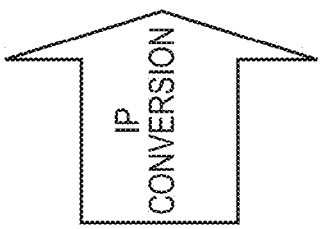
IP CONVERSION
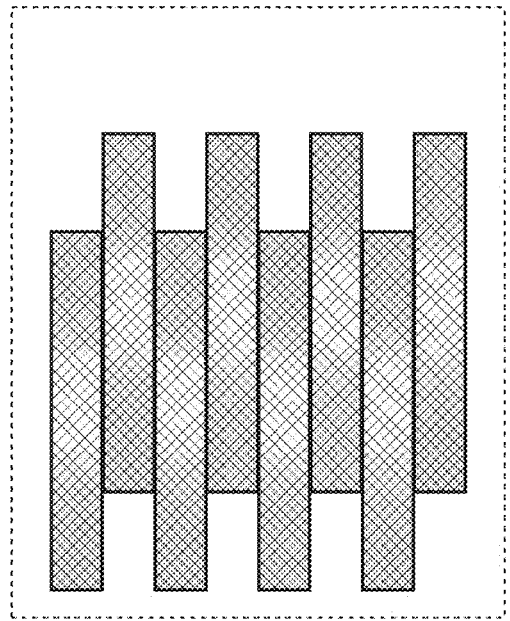
FIG. 11A
INTERLACE IMAGE

MOTION VECTOR ESTIMATION DEVICE, MOTION VECTOR ESTIMATION METHOD, AND PROGRAM FOR ESTIMATING MOTION VECTOR

This application is a National Stage Entry of PCT/JP2012/077554 filed on Oct. 25, 2012, which claims priority from Japanese Application 2011-249679 filed on Nov. 15, 2011, the contents of all of which are incorporated herein by reference, in their entirety.

TECHNICAL FIELD

The present invention relates to a motion vector estimation device for estimating a motion vector from a moving image, a motion vector estimation method, and a program for estimating motion vector.

BACKGROUND ART

Processing of estimating a motion of each pixel between consecutive frames in a moving image is used in an MPEG (Moving Picture Experts Group) coding method, and device, a three-dimensional noise removal method, and device that remove noise by position-aligning images of a plurality of frames and combining the images, and a super resolution technique for generating a high resolution image from images of a plurality of frames.

Two luminance images f and f' having a predetermined time interval therebetween, in a moving image including a minute motion, and a result obtained by estimating a motion vector from f to f' in each pixel are illustrated in FIG. 1. Hereafter, a horizontal direction component of a motion vector at a coordinate (x, y) is denoted by u(x, y), and a vertical direction component thereof is denoted by v(x, y).

An example of a conventional motion vector estimation method is described in NPL 1. In the technique, an energy function E represented by the following Math. is considered.

Math. 1

$$E = \sum_{x,y \in f} \{(f_x(x, y) \cdot u(x, y) + f_y(x, y) \cdot v(x, y) + f_t(x, y))^2 + \alpha(|\nabla u(x, y)|^2 + |\nabla v(x, y)|^2)\}$$

Here, the first term is called data term, and the second term is called regularizing term. Furthermore, $f_x(x, y)$, $f_y(x, y)$, and $f_t(x, y)$ are partial differentials of a pixel value $f(x, y)$ at a coordinate (x, y) in directions of an x axis, a y axis, and a time axis, respectively, and are represented by the following Math.

$f_y(x,y)=f(x,y+1)-f(x,y)$ $f_x(x,y)=f(x+1,y)-f(x,y)$ $f_t(x,y)=f'(x,y)-f(x,y)$     Math. 2

Furthermore, $\nabla u(x,y), \nabla v(x,y)$     Math. 3 are gradient vectors at the coordinate (x, y) and represented by the following Math.

Math. 4

$$\nabla u(x, y) = \begin{pmatrix} u(x+1, y) - u(x, y) \\ u(x, y+1) - u(x, y) \end{pmatrix}$$

$$\nabla v(x, y) = \begin{pmatrix} v(x+1, y) - v(x, y) \\ v(x, y+1) - v(x, y) \end{pmatrix}$$

The first term in { } in the right side of Math. 4 is called data term and represents a constraint that the luminance value on the images f and f' does not change between before and after a movement with motion vectors u(x, y) and v(x, y). In the same way, the second term is called smoothing term, and represent a constraint that the motion vectors u(x, y) and v(x, y) change with spatial smoothness. Intensities of both constraints are adjusted by using a smoothing term weight a.

Optimum motion vectors u(x, y) and v(x, y) minimize the above-described energy function. At this time, the following constraint Math. concerning u(x, y) and v(x, y) is obtained by making a partial differential of the above-described energy function with respect to u(x, y) and v(x, y) equal to zero.

$f_x(x,y)^2 \cdot u(x,y) + f_x(x,y) \cdot f_y(x,y) \cdot v(x,y) + f_x(x,y) \cdot f_t(x,y) - \alpha \cdot \Delta u(x,y) = 0$ $f_x(x,y) \cdot f_y(x,y) \cdot u(x,y) + f_y(x,y)^2 \cdot v(x,y) + f_y(x,y) \cdot f_t(x,y) - \alpha \cdot \Delta v(x,y) = 0$     Math. 5

Here, $\Delta$ is the Laplacian, and $\Delta_u(x, y)$ and $\Delta_v(x, y)$ are represented by the following Math.

$\Delta u(x,y)=u(x+1,y)+u(x-1,y)+u(x,y+1)+u(x,y-1)-4 \cdot u(x,y)$ $\Delta v(x,y)=v(x+1,y)+v(x-1,y)+v(x,y+1)+v(x,y-1)-4 \cdot v(x,y)$     Math. 6

The above-described constraint Math. includes equations concerning the motion vectors u(x, y) and v(x, y) at each coordinate, and u(x, y) and v(x, y) are found by solving the simultaneous equations.

By the way, since repetitive calculations need a long time, a technique for detecting a motion vector without using repetitive calculations is described in PTL 1.

A technique concerning a motion detection circuit is described in PTL 2. However, the technique only detects whether there is a motion and cannot detect a motion vector.

A technique of changing over a gradient method or a block matching method depending upon the number of detected gradient parts and detecting a motion vector is described in PTL 3. However, this technique finds only one motion vector for an image as a whole.

A technique of detecting a motion vector from a contracted image and then detecting a motion vector of an image having an original resolution is described in PTL4. However, this technique relates to improvement of a search range of a motion vector.

A technique of determining a hierarchy in which motion detection is started by using data obtained by conducting discrete wavelet decomposition on an image, in a method for hierarchically detecting a motion vector is described in PTL 5.

CITATION LIST

Patent Literature

{PTL 1} JP-A-6-150007
{PTL 2} JP-A-2000-115585
{PTL 3} JP-A-2009-88884
{PTL 4} JP-A-2010-74496
{PTL 5} JP-A-2011-82700

Non Patent Literature

{NPL 1} Bruhn et al., "Lucas/Kanade meets Horn/Schunck: combining local and global optic flow methods," International Journal of Computer Vision, Volume 61 Issue 3, 2005.

SUMMARY OF INVENTION

Technical Problem

A problem of the technique in the above-described NPL 1 is that the quantity of calculations is large. The reason is as follows. It is practically impossible to solve the above-described simultaneous equations analytically because giant matrix computations of (the number of pixels×2)×(the number of pixels×2) dimension are needed. In general, it is necessary to give initial values to u(x, y) and v(x, y) and optimize them by repetitive calculations.

An object of the present invention is to provide a motion vector estimation device, a motion vector estimation method, and a motion vector estimation program capable of estimating a motion vector with a less calculation quantity.

Solution to Problem

According to a first aspect, the present invention provides a motion vector estimation device that estimates a motion vector for each of a plurality of pixel groups included in an input image, each pixel group including at least one pixel, by repetitive calculations, the motion vector estimation device including a means that conducts the repetitive calculations intended for pixel groups having a high frequency component among the plurality of pixel groups included in the input image, and then conducts the repetitive calculations intended for pixel groups having no high frequency components among the plurality of pixel groups included in the input image.

According to a second aspect, the present invention provides a motion vector estimation method used to estimate a motion vector for each of a plurality of pixel groups included in an input image, each pixel group including at least one pixel, by repetitive calculations, the motion vector estimation method including a step of conducting the repetitive calculations intended for pixel groups having a high frequency component among the plurality of pixel groups included in the input image, and then conducting the repetitive calculations intended for pixel groups having no high frequency components among the plurality of pixel groups included in the input image.

According to a third aspect, the present invention provides a motion vector estimation program for causing a computer to function as a motion vector estimation device that estimates a motion vector for each of a plurality of pixel groups included in an input image, each pixel group including at least one pixel, by repetitive calculations, the motion vector estimation program causing the computer to function as a means that conducts the repetitive calculations intended for pixel groups having a high frequency component among the plurality of pixel groups included in the input image, and then conducts the repetitive calculations intended for pixel groups having no high frequency components among the plurality of pixel groups included in the input image.

Advantages Effects of the Invention

According to the present invention, it is possible to estimate a motion vector with a less calculation quantity.

BRIEF DESCRIPTION OF DRAWINGS

FIG. 11 A figure illustrates a second concept diagram for explaining the interlace-progressive conversion method according to the embodiment 3 of the present invention.

DESCRIPTION OF EMBODIMENTS

Hereafter, embodiments of the present invention will be described in detail with reference to the drawings.

Figure 1:
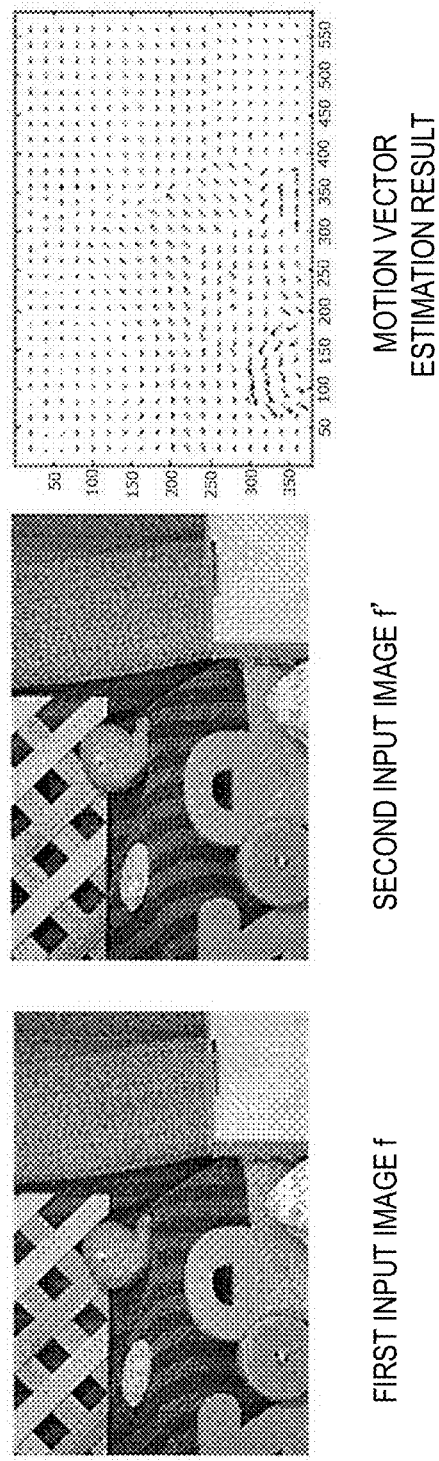
FIG. 1 A figure illustrates a diagram for explaining a motion vector therebetween two luminance images with a predetermined time interval between in a moving image with respect to each pixel.
Figure 2:
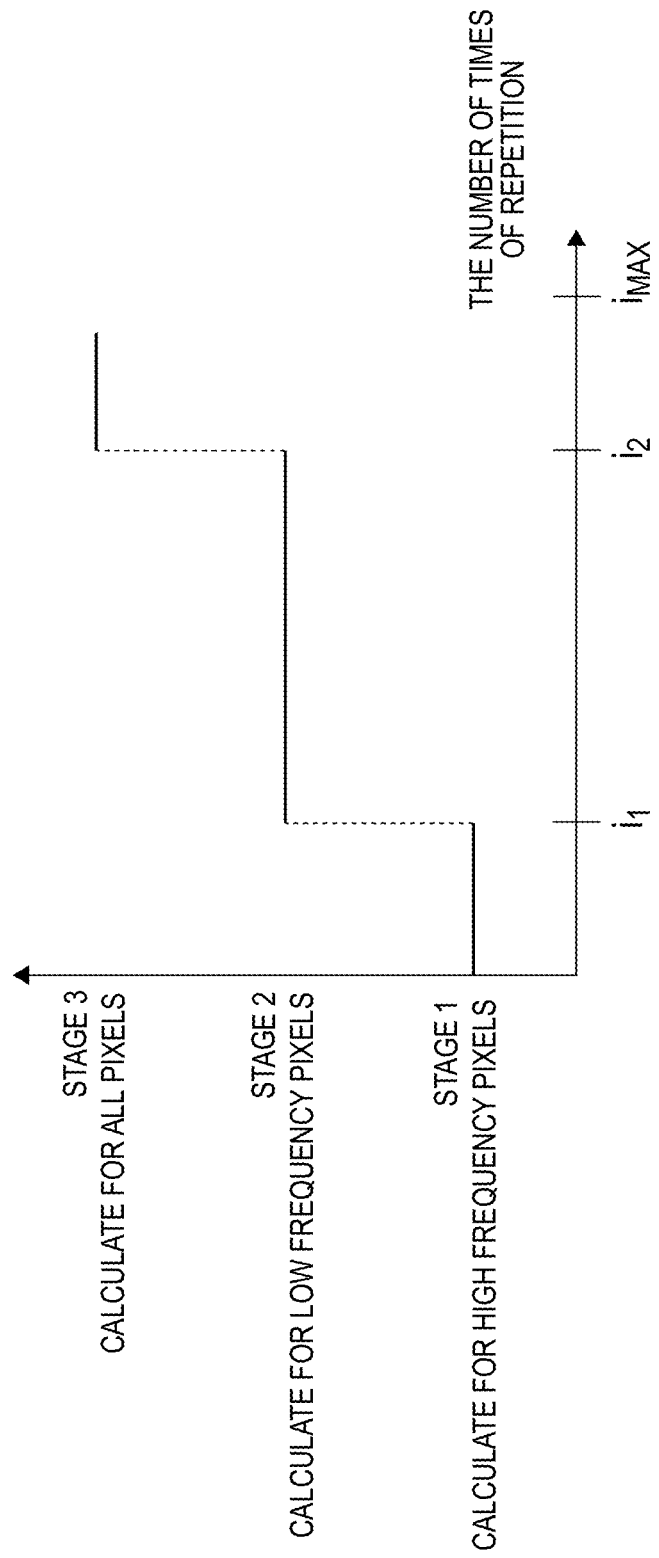
FIG. 2 A figure illustrates a diagram for explaining the number of times of repetitive calculations every pixel kind conducted in an embodiment of the present invention.

In the present embodiment, attention is paid to a point that the number of repetitions required until values of motion vectors u(x, y) and v(x, y) converge differs depending upon a pixel in a process of optimization using repetitive calculations. Specifically, as for a pixel having a high frequency on an image (such as a pixel located near an edge), the values converge in an initial stage of the repetitive calculations. On the other hand, as for a pixel having a low frequency (such as a pixel in a flat area that is less in luminance change), convergence begins later as compared with high frequency pixels. In the present embodiment, this characteristic is used. As illustrated in FIG. 2, the whole of the repetitive calculations is divided into a plurality of stages. In each stage, repetitive calculations are performed on only pixels for which convergence in the stage is expected. As a result, the object of the present invention can be achieved.

In other words, no matter whether the repetitive calculations are conducted for all pixels or the repetitive calculations are conducted for only high frequency pixels, the number of times of repetition required until calculations for high frequency pixels converge in the early stage of repetitive calculations changes little. First, therefore, repetitive calculations are conducted for only high frequency pixels. By doing so, calculations for low frequency pixels are excluded from the repetitive calculations. As a result, it is possible to reduce the number of pixels that become objects of calculation per repetition.

A state at the time when repetitive calculations for only high frequency pixels have converged is nearly the same as a state at the time when repetitive calculations for all pixels have converged for only the high frequency pixels. If repetitive calculations for only high frequency pixels have converged, therefore, then repetitive calculations are conducted for only low frequency pixels. A convergence process in repetitive calculations for only low frequency pixels conducted after repetitive calculations are conducted for only high frequency pixels is nearly the same as a convergence process in repetitive calculations conducted substantially for only low frequency pixels conducted subsequently to first convergence substantially for only high frequency pixels in a case where repetitive calculations for all pixels are conducted. If repetitive calculations for only high frequency pixels have converged, therefore, no problem is posed at all even if repetitive calculations are then conducted for only low frequency pixels. Calculations for high frequency pixels are excluded from repetitive calculations for only low frequency pixels. As a result, it is possible to reduce the number of pixels that become objects of calculation per repetition.

Even if the total number of repetitions in the present embodiment is the same as the number of repetitions in the conventional calculation, therefore, the whole calculation quantity can be reduced because it is possible to reduce the number of pixels that become objects of calculation per repetition. Furthermore, a state of calculation convergence in a case where repetitive calculations are first conducted for only high frequency pixels and then repetitive calculations are conducted for only low frequency pixels hardly changes from a state of calculation convergence in a case where repetitive calculations are conducted for all pixels from the beginning to the end. Therefore, the total number of repetitions in the case where repetitive calculations are first conducted for only high frequency pixels and then repetitive calculations are conducted for only low frequency pixels hardly increases as compared with the case where repetitive calculations are conducted for all pixels from the beginning to the end. In the present embodiment, therefore, the whole calculation quantity can be reduced.

By the way, repetitive calculations are conducted for high frequency pixels, and repetitive calculations are conducted for low frequency pixels, and finally repetitive calculations are conducted for all pixels. The reason is that processing uniting adjacent pixels is conducted by finally conducting repetitive calculations for all pixels and thereby a motion vector estimated at a boundary between a high frequency pixel and a low frequency pixel is provided with continuity.

Embodiment 1

Figure 3:
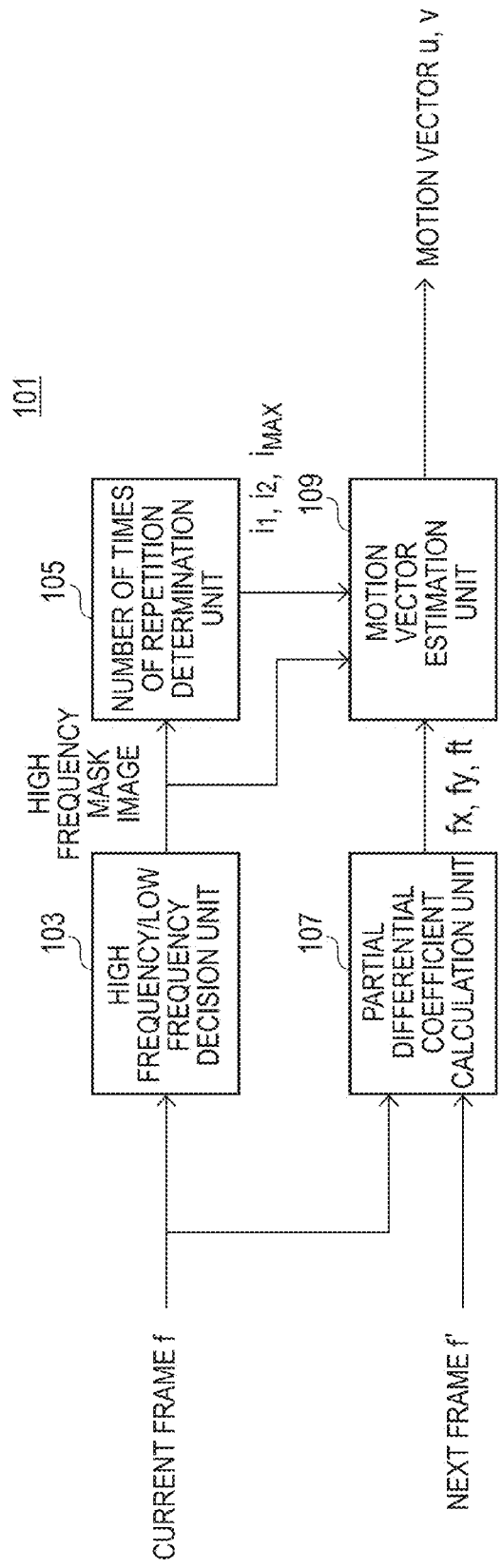
FIG. 3 A figure is a block diagram illustrating a configuration of a motion vector estimation device according to an embodiment 1 of the present invention.
Figure 4:
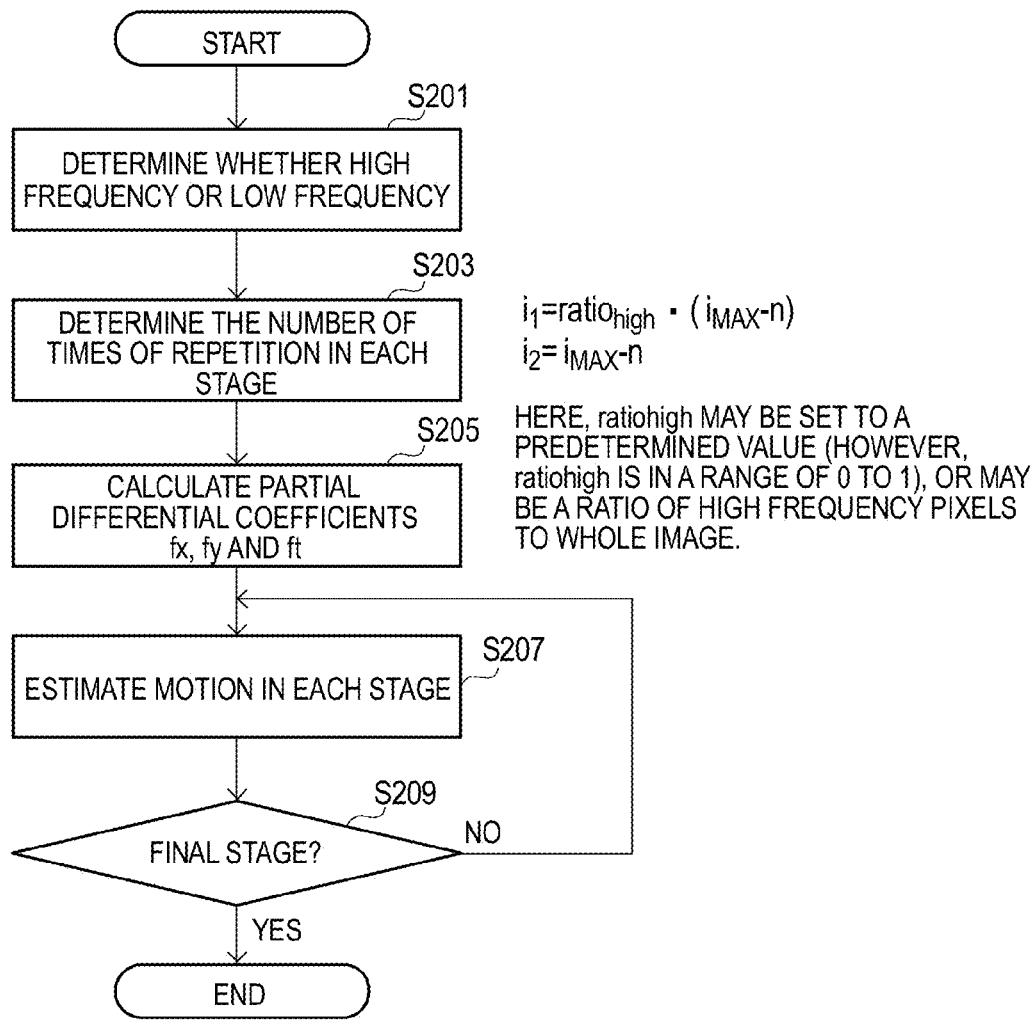
FIG. 4 A figure is a flow chart illustrating a motion vector estimation method according to the embodiment 1 of the present invention.

An image processing device according to an embodiment 1 is illustrated in FIG. 3. Furthermore, the whole of an image processing method conducted by the image processing device is illustrated in FIG. 4.

In the present embodiment, the whole of repetitive calculations is divided into a plurality of stages. In each stage, repetitive calculations are applied to only pixels for which convergence in each stage is expected. When the number of times of repetition determined for each stage is reached, or when a difference between a result of repetitive calculations in each pixel obtained last time and a result of repetitive calculations in the pixel obtained this time has become a predetermined threshold or less, repetitive calculations are discontinued and processing proceeds to the next stage. As a result, a motion vector estimation result having a precision approximately equivalent to that of the conventional technique is obtained with a calculation quantity less than that of the conventional technique. Here, a result of repetitive calculations is, for example, a value of the energy function. Furthermore, as a method of repetitive calculations, for example, the gradient method, the conjugate gradient method, the Gauss-Newton method, or the Levenberg-Marquardt method is used.

With reference to FIG. 3, a motion vector estimation device 101 according to the embodiment 1 includes a high frequency/low frequency decision unit 103, a number of times of repetition determination unit 105, a partial differential coefficient calculation unit 107, and a motion vector estimation unit 109.

Figure 5:
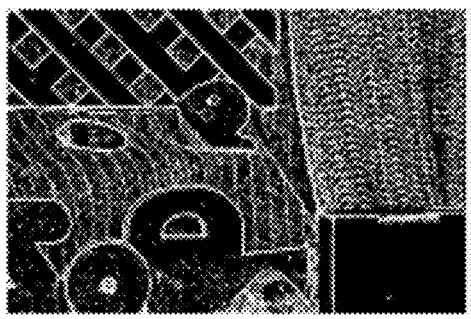
FIG. 5 A figure illustrates an example of a high frequency mask image utilized in an embodiment of the present invention.

The high frequency/low frequency decision unit 103 makes a decision whether each of pixels in a current frame f includes a high frequency. If the pixel includes a high frequency, the high frequency/low frequency decision unit 103 judges the pixel to be a high frequency pixel. Unless the pixel includes a high frequency, the high frequency/low frequency decision unit 103 judges the pixel to be a low frequency pixel. Here, "the pixel includes a high frequency" means that an output level of at least a predetermined value is obtained when a spatial filter that passes high frequencies and obstructs low frequencies is disposed around the pixel. The high frequency/low frequency decision unit 103 outputs a high frequency mask image as illustrated in FIG. 5 on the basis of decision results of respective pixels. In FIG. 5, a white colored part is formed of high frequency pixels and a black colored part is formed of low frequency parts.

The number of times of repetition determination unit 105 calculates $i_1$ and $i_2$ for determining the number of times of repetition $i_1$ in repetitive calculations for high frequency pixels, the number of times of repetition $i_2-i_1$ in repetitive calculations for low frequency pixels, and the number of times of repetition $i_{MAX}-i_2$ in repetitive calculations for all pixels, on the basis of a ratio of high frequency pixels to all pixels included in a high frequency mask image, a parameter having a predetermined value, and so on. Specifically, the number of times of repetition determination unit 105 finds $i_1$ and $i_2$ according to $$i_1 = \text{ratio}_{high} \cdot (i_{MAX} - n)$$

$$i_2 = i_{MAX} - n$$

where $\text{ratio}_{high}$ is a ratio of high frequency pixels to the whole image, n is a predetermined parameter, and $i_{MAX}$ is the total number of times of repetition. However, $\text{ratio}_{high}$ may also be a predetermined parameter.

The partial differential coefficient calculation unit 107 calculates a partial differential coefficient $f_x(x, y)$ of a motion vector for each pixel value $f(x, y)$ in the x direction, a partial differential coefficient $f_y(x, y)$ of the motion vector for each pixel in the y direction, and a partial differential coefficient $f_t(x, y)$ of the motion vector for each pixel in the time direction on the basis of a pixel included in a current frame image f and a pixel included in the next frame image f'.

The motion vector estimation unit 109 receives the high frequency mask image, the number of times of repetition $i_1$, $i_2$ and $i_{MAX}$, and the partial differential coefficients $f_x(x, y)$, $f_y(x, y)$ and $f_t(x, y)$ as inputs, and estimates motion vectors $u(x, y)$ and $v(x, y)$ for each high frequency pixel in the current frame image f and motion vectors u(x, y) and v(x, y) for each low frequency pixel in the current frame image f on the basis of the inputs. For a pixel judged to be a high frequency pixel on the basis of the high frequency mask image, a calculation according to a solution of repetitive calculations for solving the above-described constraint Math is repeated the number of times specified by the number of times of repetition $i_1$. For a pixel judged to be a low frequency pixel on the basis of the high frequency mask image, a calculation according to a solution of repetitive calculations for solving the above-described constraint Math is repeated the number of times specified by the number of times of repetition $i_2-i_1$. In addition, for all pixels, a calculation according to a solution of repetitive calculations for solving the above-described constraint Math is repeated the number of times specified by the number of times of repetition $i_{MAX}-i_2$.

An operation of the motion vector estimation device illustrated in FIG. 3 will now be described with reference to FIG. 4. With reference to FIG. 4, first, the high frequency/low frequency decision unit 103 determines whether each of pixels in the current frame image f is a high frequency pixel or a low frequency pixel (step S201).

Then, the number of times of repetition determination unit 105 determines (calculates) the number of times $i_1$, $i_2$ and $i_{MAX}$ relating to the number of times of repetition (step S203).

Then, the partial differential coefficient calculation unit 107 calculates partial differential coefficients $f_x(x, y)$, $f_y(x, y)$ and $f_t(x, y)$ for each pixel value $f(x, y)$ in the current frame image (step S205).

Then, for high frequency pixels included in the current frame image, the repetitive calculation for solving the above-described constraint Math to find a motion vector is repeated $i_1$ times. For low frequency pixels included in the current frame image, the repetitive calculation for solving the above-described constraint Math to find a motion vector is repeated $i_2-i_1$ times. And for all frequency pixels included in the current frame image, the repetitive calculation for solving the above-described constraint Math to find a motion vector is repeated $i_{MAX}-i_2$ times. (steps S207 and S208). As for a pixel for which a calculation result has converged in the middle of each repetition, however, it is not necessary to conduct repetitive calculations thereafter.

Embodiment 2

An embodiment 2 will now be described in detail with reference to the drawings.

The embodiment 2 provides the embodiment 1 with multiple resolutions.

Figure 6:
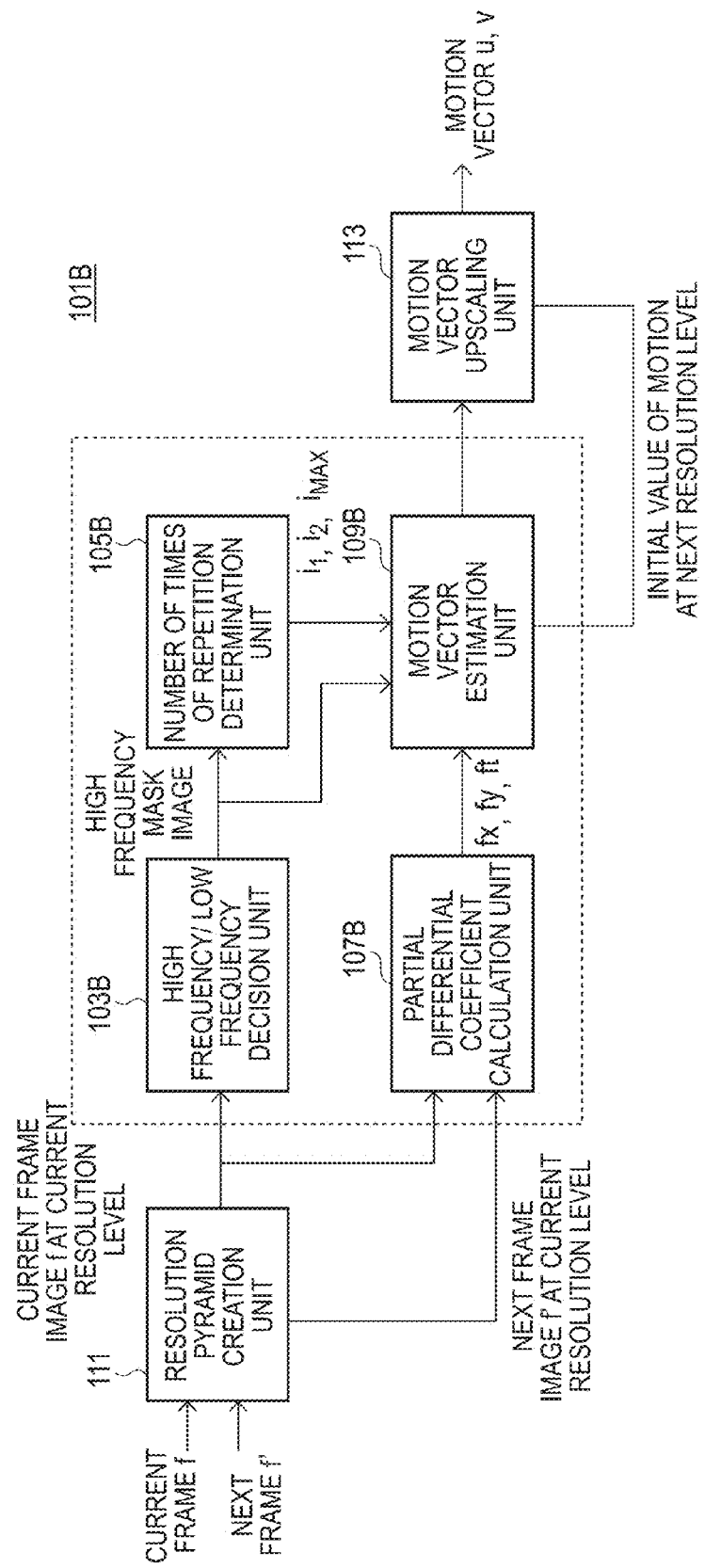
FIG. 6 A figure is a block diagram illustrating a configuration of a motion vector estimation device according to an embodiment 2 of the present invention.
Figure 7:
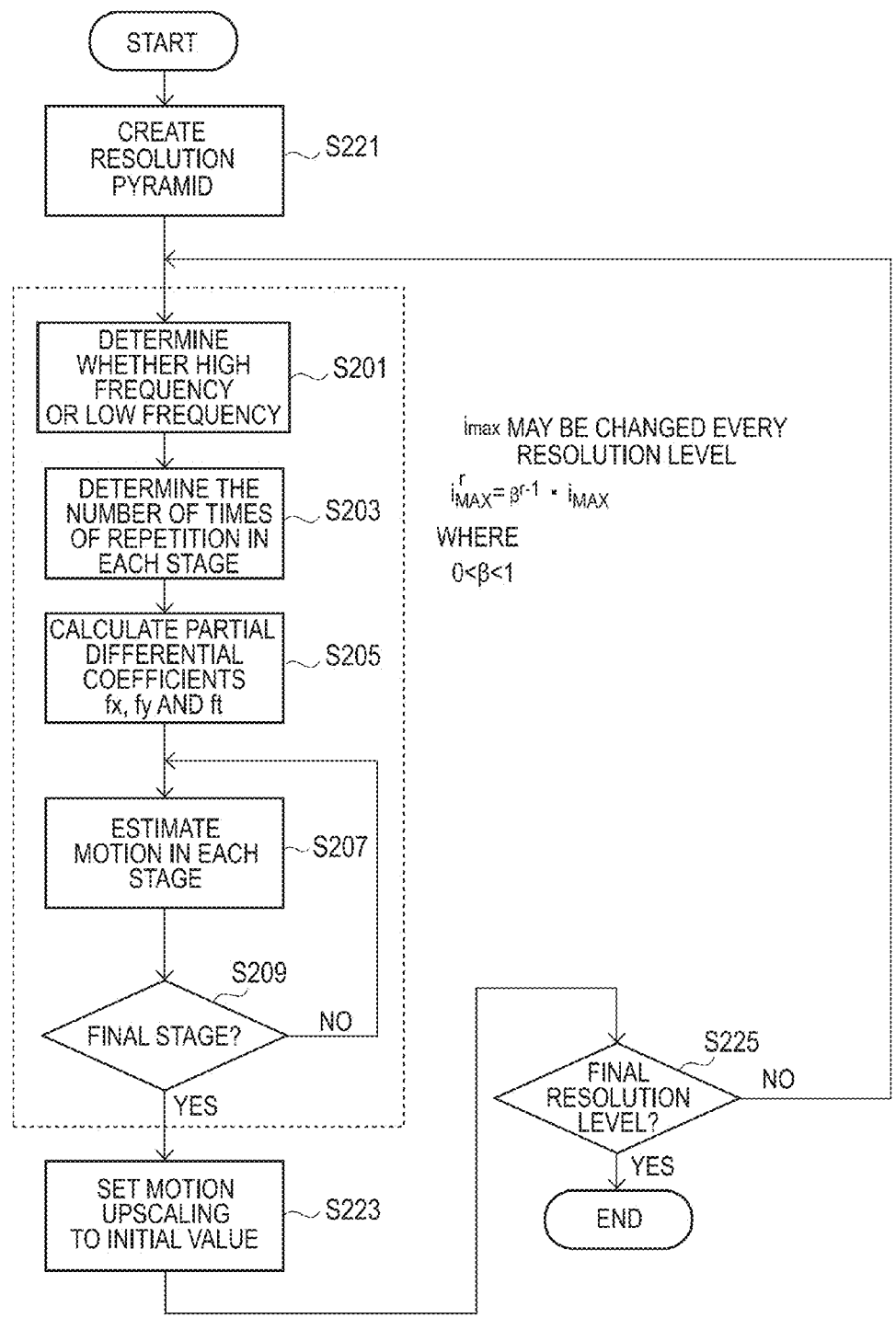
FIG. 7 A figure is a flow chart illustrating a motion vector estimation method according to the embodiment 2 of the present invention.
Figure 8:
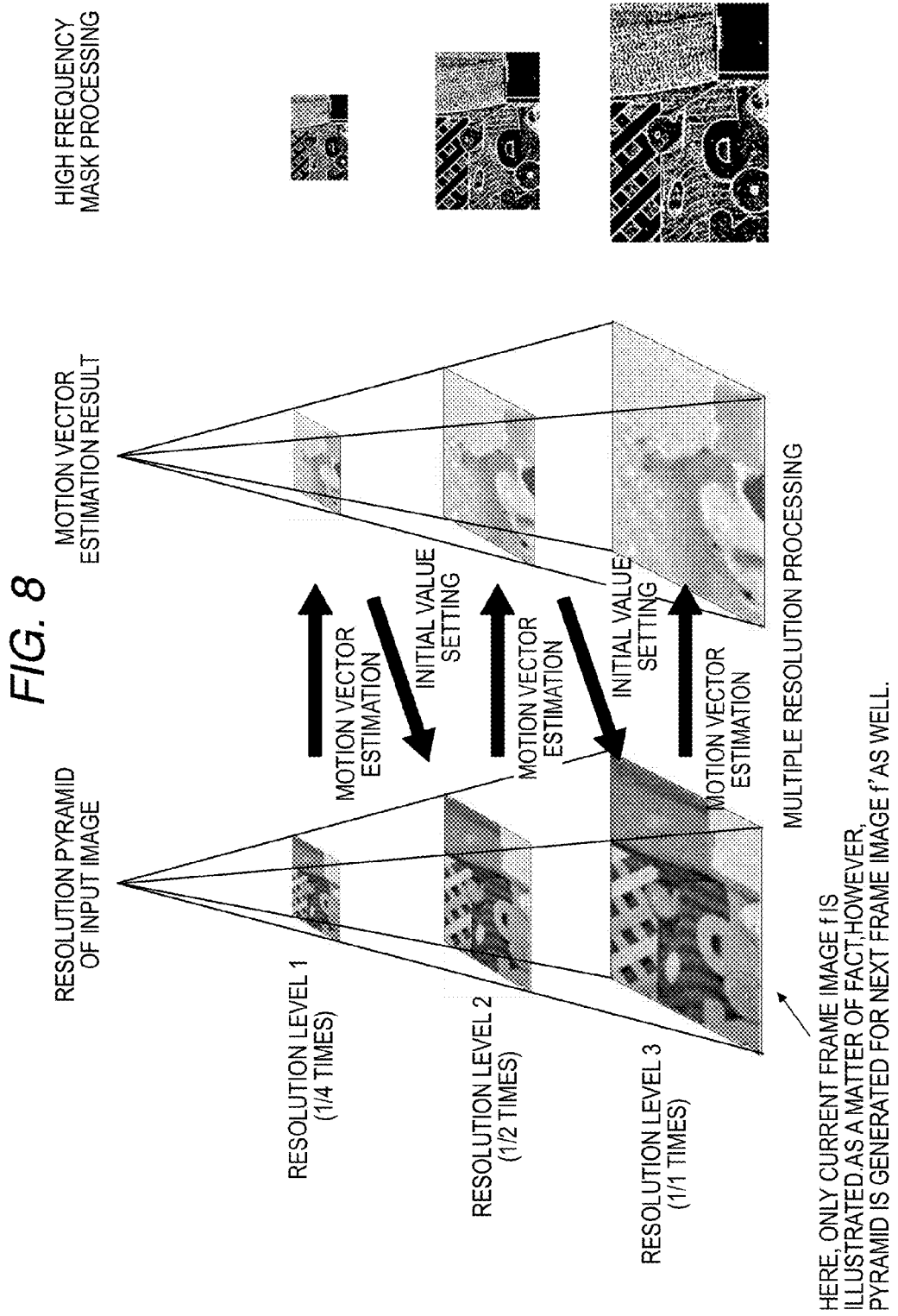
FIG. 8 A figure illustrates a concept diagram for explaining a motion vector estimation method according to the embodiment 2 of the present invention.

An image processing device according to the embodiment 2 is illustrated in FIG. 6. Furthermore, the whole of an image processing method conducted by the image processing device is illustrated in FIG. 7.

In the embodiment 2, a motion vector is found in a low resolution image obtained by downscaling an original image to ¼ in the longitudinal direction and ¼ in the lateral direction. And at the next resolution level of ½ in the longitudinal direction and ½ in the lateral direction, a motion vector obtained by upscaling the motion vector found at the resolution level of ¼ in the longitudinal direction and ¼ in the lateral direction, according to the resolution level of ½ in the longitudinal direction and ½ in the lateral direction is set to be an initial value of a motion vector. Then, a motion vector at a resolution level of ½ in the longitudinal direction and ½ in the lateral direction is found. Such processing is repeated up to a final resolution level, i.e., up to the same resolution level as that of the input image. It also becomes possible to estimate a large motion vector that cannot be estimated correctly in the embodiment 1, by taking such a configuration.

With reference to FIG. 6, a motion vector estimation device 101B according to the embodiment 2 includes a high frequency/low frequency decision unit 103B, a number of times of repetition determination unit 105B, a partial differential coefficient calculation unit 107B, a motion vector estimation unit 109B, a resolution pyramid creation unit 111, and a motion vector upscaling unit 113.

The resolution pyramid creation unit 111 creates a primary low resolution image having a resolution of ½ in the longitudinal direction and ½ in the lateral direction and a secondary low resolution image having a resolution of ¼ in the longitudinal direction and ¼ in the lateral direction for each of the current frame image f and the next frame image f'. When creating an image having a resolution of ½ in the longitudinal direction and ½ in the lateral direction as compared with an image having a resolution, from the image having the resolution, high frequency components are removed by applying a Gaussian filter and pixels are sampled every other pixel in the longitudinal direction and the lateral direction. However, this is a method in a case where a resolution that is lower than a certain resolution by one stage is ½ as compared with the certain resolution. The resolution that is lower than the certain resolution by one stage may be other than ½. In that case, for example, filtering and resampling depending upon the resolution are conducted.

The high frequency/low frequency decision unit 103B, the number of times of repetition determination unit 105B, the partial differential coefficient calculation unit 107B and the motion vector estimation unit 109B are similar to the high frequency/low frequency decision unit 103, the number of times of repetition determination unit 105, the partial differential coefficient calculation unit 107 and the motion vector estimation unit 109, respectively. For an image having the same resolution as the input image (original resolution image), the primary low resolution image, and the secondary low resolution image, however, the high frequency/low frequency decision unit 103B, the number of times of repetition determination unit 105B, the partial differential calculation unit 107B and the motion vector estimation unit 109B operate in order of the secondary resolution image, the primary low resolution image, and the original resolution image.

The motion upscaling unit 113 upscales a motion vector found for a pixel included in an image of the current resolution to a resolution of twice in the longitudinal direction and twice in the lateral direction by using a predetermined method (such as, for example, bilinear interpolation, nearest interpolation, bicubic interpolation, and so on), and feeds back the upscaled motion vector to the motion vector estimation unit 109B as an initial value to be used when finding a motion vector for a pixel included in a pixel of the next resolution (twice in the longitudinal direction and twice in the lateral direction).

An operation of the motion vector estimation device 101B illustrated in FIG. 6 will now be described with reference to FIG. 7.

Since steps S201, S203, S205, S207 and S209 are similar to the steps S201, S203, S205, S207 and S209 in the embodiment, respectively, duplicated description will be omitted. However, $i_{MAX}$ is made to differ every resolution r and represented by $i^r_{MAX}$. Corresponding to this, $i_1$ and $i_2$ are replaced by $i^r_1$ and $i^r_2$.

First, the resolution pyramid creation unit 111 creates the original resolution image, the primary low resolution image, and the secondary low resolution image for each of the current frame image f and the next frame image f'(step S221).

Then, steps S201, S203, S205, S207 and S209 are executed.

Then, the motion vector upscaling unit 113 upscales a motion vector (step S223).

Then, it is determined whether the current resolution is the final resolution (i.e., the original resolution) (step S225). Unless the current resolution is the final resolution (NO at the step S225), the resolution is advanced by one stage (the resolution is increased to twice in the longitudinal direction and twice in the lateral direction), and the processing returns to the step S201. If the current resolution is the final resolution (YES at the step S225), the motion vector found at the present time is taken as the final estimated motion vector and the processing is terminated.

Embodiment 3

An embodiment 3 will now be described in detail with reference to the drawings.

The embodiment 3 is an application of the motion vector estimation device 101 according to the embodiment 1 or the motion vector estimation device 101B according to the embodiment 2 to an interlace-progressive conversion device.

Figure 9:
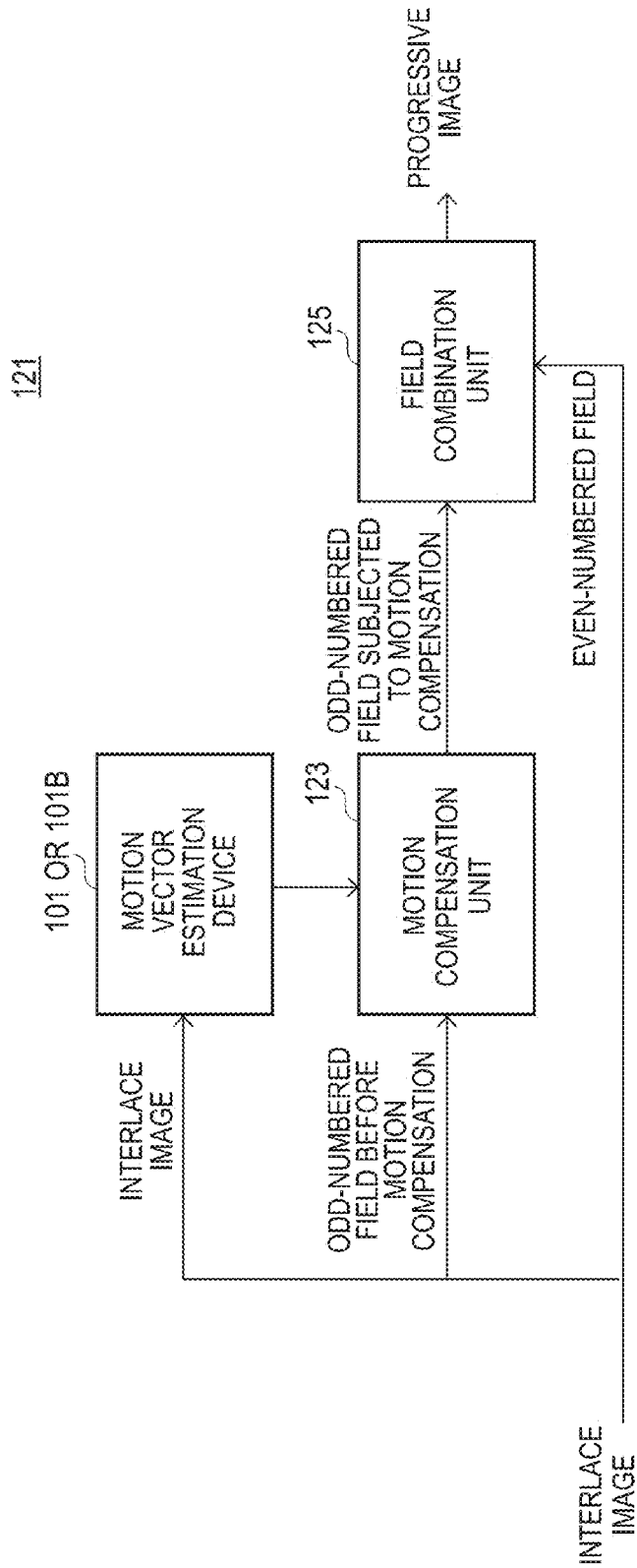
FIG. 9 A figure is a block diagram illustrating a configuration of an interlace-progressive conversion device according to an embodiment 3 of the present invention.

With reference to FIG. 9, an interlace-progressive conversion device 121 according to the embodiment 3 includes the motion vector estimation device 101 or 101B, a motion compensation unit 123, and a field combination unit 125.

Figure 10:
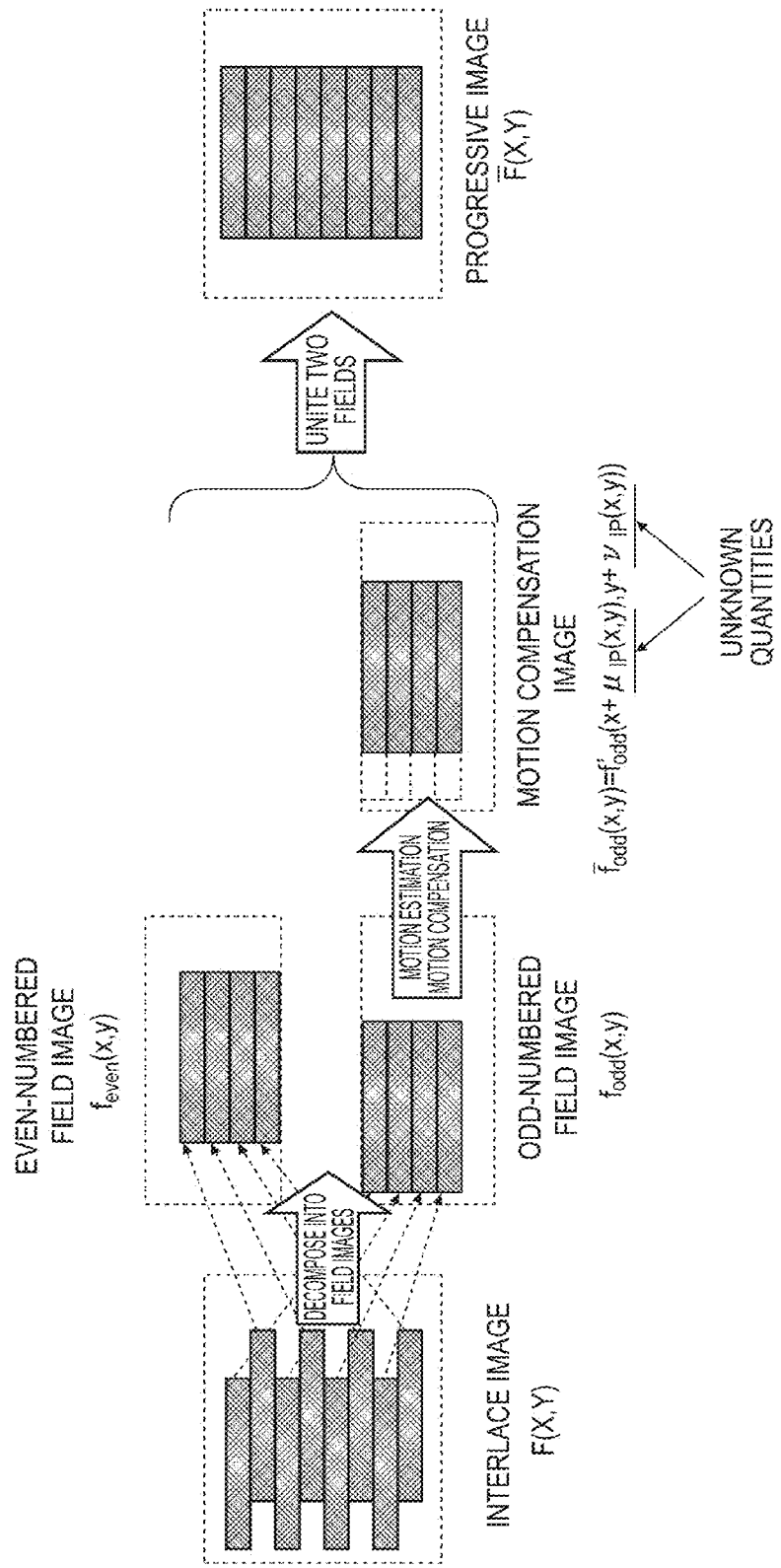
FIG. 10 A figure illustrates a first concept diagram for explaining an interlace-progressive conversion method according to the embodiment 3 of the present invention.

As illustrated in FIG. 10, the motion vector estimation device 101 or 101B regards an odd-numbered field image or an even-numbered field image included in interlace images as a field image that becomes an object of motion vector estimation, finds the partial differential coefficients $f_x(x, y)$, $f_y(x, y)$ and $f_t(x, y)$ in the above-described constraint Math. for calculating a motion vector on the basis of two field images having the object field image therebetween, solves the above-described constraint Math. using the partial differential coefficients by conducting repetitive calculations, and thereby estimates a motion vector for a pixel included in the object field image. By the way, the motion vector is a motion vector between the field image that becomes the object of the motion vector estimation and a field image adjacent to the object field image.

The motion compensation unit 123 conducts motion compensation on a pixel included in the field image that has become the object of the motion vector estimation, by using the motion vector estimated by the motion vector estimation device 101 or 101B.

As illustrated in FIGS. 10 and 11, the field combination unit 125 combines the field image subjected to the motion compensation conducted by the motion compensation unit 123 with the other field image included in the input interlace image, thereby obtains a progressive image, and outputs the progressive image.

The embodiments 1 to 3 bring about an effect that it is possible to obtain an estimated motion vector having a precision nearly equal to that of the conventional technique with a calculation quantity less than that of the conventional technique.

The reason is that the whole of repetitive calculations is divided into a plurality of stages and in each stage only pixels for which convergence is expected in the stage are set to be an object of repetitive calculations.

Example 1

The above-described embodiments will now be described by using concrete examples. The present example relates to the embodiment 2.

First, the resolution pyramid creation unit 111 illustrated in FIG. 6 generates a resolution pyramid for each of the current frame image f and the next frame image f'. Specifically, the resolution pyramid creation unit 111 applies a Gaussian filter to each (hereafter referred to as "original frame image") of the current frame image f and the next frame image f', thereby removes high frequency components, then conducts sampling on pixels every other pixel, and thereby generates a primary low resolution image having an image resolution that becomes ½ in the longitudinal direction and ½ in the lateral direction as compared with the original frame image.

In addition, the resolution pyramid creation unit 111 applies the above-described Gaussian filter and the sampling every other pixel to the primary resolution frame image, and thereby generates a secondary low resolution image having an image resolution that becomes ¼ in the longitudinal direction and ¼ in the lateral direction as compared with the original frame image.

Hereafter, resolutions that are ¼ times, ½ times and equal as compared with the resolution of the original image are referred to as resolution levels 1, 2 and 3, respectively.

Subsequently, processing described hereafter is repeated in order of the resolution level 1, 2 and 3. First, the high frequency/low frequency decision unit 103B determines whether each of pixels in the current frame image f having a current resolution level r (r=1, 2, 3) has a high frequency component, and generates a high frequency mask image representing pixels having a high frequency component. Specifically, the high frequency/low frequency decision unit 103B applies Sobel filters in the horizontal and vertical directions represented by a coefficient matrix described below to the current frame image f, calculates luminance gradient components in the horizontal and vertical directions at each coordinate, and judges a pixel for which a luminance gradient intensity found on the basis of luminance gradient components in the horizontal and vertical directions exceeds a threshold to be a high frequency pixel. And a pixel that is not a high frequency pixel is judged to be a low frequency pixel. Here, for example, a square sum, an absolute value sum, or a maximum value of a luminance gradient component in the horizontal direction and a luminance gradient component in the vertical direction is taken as a luminance gradient.

Math. 7

$$\begin{pmatrix} -1 & 0 & 1 \\ -2 & 0 & 2 \\ -1 & 0 & 1 \end{pmatrix} \begin{pmatrix} -1 & -2 & -1 \\ 0 & 0 & 0 \\ 1 & 2 & 1 \end{pmatrix}$$

By doing so, a pixel having a low frequency component and having no high frequency components is classified into low frequency components, whereas a pixel having no low frequency components and having a high frequency component, and a pixel having a high frequency component and having a high frequency component are classified into high frequency components.

Then, the number of times of repetition determination unit 105B calculates the number of times of repetition $i^r_1$, $i^r_2$ and $i^r_{MAX}$ for terminating the stages 1, 2 and 3, respectively, at the current resolution level r. First, the number of times of repetition determination unit 105B calculates $i^r_{MAX}$ according to the following expression.

$$i^r_{MAX} = \beta^{r-1} i_{MAX}$$

where $i^r_{MAX}$ is the predetermined maximum number of times of repetition, and β is a parameter (0<β<1) that attenuates the maximum number of times of repetition as the resolution level advances. And $\beta^{r-1}$ represents the (r−1)th power of $\beta$. Subsequently, the number of times of repetition determination unit 105B calculates the number of times of repetition $i^r_1$ for terminating the stage 1, i.e., the stage for optimizing an estimated motion concerning a high frequency pixel, at the current resolution level r, and the number of times of repetition $i^r_2$ for terminating the stage 2, i.e., the stage for optimizing an estimated motion concerning a low frequency pixel, at the current resolution level r, according to the following expressions.

$$i^r_1 = \text{ratio}_{high} \cdot (i^r_{MAX} - n)$$

$$i^r_2 = i^r_{MAX} - n$$

where $\text{ratio}_{high}$ is a ratio of high frequency pixels to the whole image at the current resolution level r, and n is a predetermined parameter.

Subsequently, the partial differential coefficient calculation unit 107B calculates three partial differential coefficients $f_x(x, y)$, $f_y(x, y)$ and $f_t(x, y)$ required in motion vector estimation processing from the images f and f' at the current resolution level r.

Then, the motion vector estimation unit 109B executes motion vector estimation processing in order of the stages 1 to 3.

Specifically, first in the stage 1, the motion vector estimation unit 109B conducts repetitive calculations for high frequency pixels (white pixels in the high frequency mask image in FIG. 5) and optimizes an estimated motion vector for high frequency pixels. This stage is executed from a repetition of the first time to a repetition of the $i^r_1$-th time. Subsequently, in the stage 2, the motion vector estimation unit 109B conducts repetitive calculations for low frequency pixels (black pixels in the high frequency mask image in FIG. 5) and optimizes an estimated motion vector for low frequency pixels. This stage is executed from a repetition of the $(i^r_1+1)$-st time to a repetition of the $i^r_2$-th time. Finally, in the stage 3, the motion vector estimation unit 109B conducts repetitive calculations for all pixels in the image and optimizes an estimated motion vector for all pixels.

By the way, the motion vector estimation processing in each stage is conducted by using the technique disclosed in NPL 1.

A motion vector for all pixels at the resolution level r is estimated by the processing described heretofore.

Finally, the motion upscaling unit 113 upscales estimated motion vector images u and v to a resolution of twice by bilinear interpolation, and thereby generates an initial value of an estimated motion vector at the next resolution level r+1.

A motion vector for all pixels at the current resolution between the current frame and the next frame is estimated by repeating the above-described processing up to the resolution level 3.

Example 2

The example 1 is directed for a case where the input is a progressive image. If it is supposed to use the motion vector estimation in the example 1, it is necessary in a case where the input is an interlace image to decompose images into even-numbered field images and odd-numbered field images, convert each field image to a progressive image by conducting, for example, processing of interpolating a pixel value on a line that does not exist in each field image (an odd-numbered line in the case of the even-numbered field image and an even-numbered line in the case of the odd-numbered field image) with an average of pixel values on lines existing above and below the line that does not exist, and apply the motion vector estimation in the example 1 to two progressive images.

In this technique, however, a motion is estimated not only for pixels existing in each field image but also for pixels generated by the interpolation. A calculation quantity that is twice a calculation quantity originally needed occurs.

In view of this point, an example 2 is provided. The example 2 relates to a motion compensation type interlace-progressive (IP) conversion in which in a case where the input is an interlace image, motion vector estimation is conducted without converting an interlace image to a progressive image as pre-processing and then a progressive image is generated on the basis of the estimated motion vector.

By the way, the example 2 is a concrete example of the embodiment 3.

A state of the example 2 is illustrated in FIG. 10. In the example 2, a progressive image is generated by receiving an interlace image as an input, estimating a motion vector between an even-numbered field and an odd-numbered field in the interlace image, conducting motion compensation on an odd-numbered field image on the basis of the estimated motion vector, and uniting the odd-numbered field subjected to the motion compensation with the even-numbered field image.

The example 2 differs from the example 1 in that processing of decomposing an input interlace image into an even numbered field image $f_{even}$ and an odd-numbered field image $f_{odd}$, processing of conducting motion compensation on the odd-numbered field image $f_{odd}$ by using a motion vector estimation result, and processing of uniting the even numbered field image $f_{even}$ and the odd-numbered field image $f_{odd}$ subjected to motion compensation into one progressive image are added and Math. used in motion vector estimation processing differs.

Hereafter, Math. used in the motion vector estimation processing will be described.

Math. used in the motion vector estimation processing in the example 2 is as follows.

Math. 8

$$2f_x^{even}(x, y)^2 \cdot u(x, y) + 2f_x^{even}(x, y) \cdot f_y^{even}(x, y) \cdot v(x, y) +$$
$$2f_x^{even}(x, y) \cdot f_t^{even}(x, y) - f_x^{even}(x, y) \cdot f_y^{even}(x, y) - \alpha \cdot \Delta u(x, y) = 0$$

$$2f_x^{even}(x, y) \cdot f_y^{even}(x, y) \cdot u(x, y) + 2f_y^{even}(x, y)^2 \cdot v(x, y) +$$
$$2f_y^{even}(x, y) \cdot f_t^{even}(x, y) - f_y^{even}(x, y)^2 - \alpha \cdot \Delta v(x, y) = 0$$

By the way, in a case where the input image includes a telop or the like that scrolls at a constant velocity in the lateral direction or longitudinal direction, either one or both of u(x, y) and v(x, y) becomes known. For example, in a case where a telop that scrolls in the lateral direction in a bottom part of a screen exists, it is already known that v(x, y)=0 in pixels in the bottom part of the screen.

In the case where it is previously known that u(x, y) and v(x, y) assume specific values $u_0(x, y)$ and $v_0(x, y)$ in this way, $$w_u(x,y) \cdot (u(x,y) - u_0(x,y))$$

$$w_v(x,y) \cdot (v(x,y) - v_0(x,y))$$

are added to right sides of the first and second expressions, respectively. Here, $w_u(x, y)$ and $w_v(x, y)$ represent reliabilities whether the coordinate (x, y) assumes $u_0$(x, y) and $v_0$(x, y), respectively. As the reliability becomes higher, $w_u$(x, y) and $w_v$(x, y) assume larger values. In a case where there is no reliability, i.e., it is not previously known to assume a specific value, $w_u$(x, y) and $w_v$(x, y) become zero.

By the way, in the example 2, motion compensation is conducted on the odd-numbered field image by taking the even-numbered field as a reference. In a case where motion compensation is conducted on the even-numbered field image by taking the odd-numbered field as a reference, however, it suffices to interchange $f_{even}$ and $f_{odd}$ with each other in the expressions.

In a case where the input is an interlace image, it becomes possible to estimate a motion between field images with a minimum required calculation quantity by using the example 2.

Example 3

In the example 1 and the example 2, a motion vector every pixel is found. However, a motion vector every pixel group including at least two pixels may be found. In the example 1 and the example 2, the number of pixels included in a pixel group is 1.

By the way, the above-described motion vector estimation device can be implemented by hardware, software, or a combination of them. Furthermore, a motion vector estimation method conducted by the above-described motion vector estimation device or another device can also be implemented by hardware, software, or a combination of them. Here, "implemented by software" means "implemented by a computer that reads a program and executes the program."

The program can be stored in non-transitory computer readable media of various types and supplied to a computer. The non-transitory computer readable media include tangible storage media of various types. Examples of the non-transitory computer readable media include magnetic recording media (for example, a flexible disc, magnetic tape, and a hard disc drive), magneto-optical recording media (for example, a magneto-optical disc), a CD-ROM (Read Only Memory), a CD-R, a CD-R/W, a semiconductor memory (for example, a mask ROM, and a PROM (Programmable ROM), an EPROM (Erasable PROM), a flash ROM, and a RAM (random access memory). Furthermore, the program may be supplied to a computer by transitory computer readable media of various types. Examples of the transitory computer readable media include an electric signal, an optical signal, and electromagnetic waves. The transitory computer readable media can supply the program to a computer via a wired communication path such as an electric wire or an optical fiber, or a wireless communication path.

A part or the whole of the above-described embodiments can be stated as in the ensuing additions, but is not restricted to the ensuing additions.

(Addition 1)

A motion vector estimation device that estimates a motion vector for each of a plurality of pixel groups included in an input image, each pixel group including at least one pixel, by repetitive calculations,
the motion vector estimation device comprising:
a means that conducts the repetitive calculations intended for pixel groups having a high frequency component among the plurality of pixel groups included in the input image, and then conducts the repetitive calculations intended for pixel groups having no high frequency components among the plurality of pixel groups included in the input image.

(Addition 2)

The motion vector estimation device according to addition 1, further comprising a means that conducts the repetitive calculations intended for pixel groups having no high frequency components among the plurality of pixel groups, and then conducts the repetitive calculations intended for a whole of the plurality of pixel groups.

(Addition 3)

The motion vector estimation device according to addition 1 or 2, further comprising:
a means that generates a primary low resolution image which is lower in resolution than the input image, on the basis of the input image; and
a means that estimates a motion vector for the primary low resolution image, and then estimates a motion vector for the input image by using the motion vector estimated for the primary low resolution image as an initial value.

(Addition 4)

The motion vector estimation device according to addition 3, further comprising:
a means that generates a secondary low resolution image which is lower in resolution than the primary low resolution image, on the basis of the primary low resolution image; and
a means that estimates a motion vector for the secondary low resolution image, and then estimates a motion vector for the primary low resolution image by using the motion vector estimated for the secondary low resolution image as an initial value.

(Addition 5)

The motion vector estimation device according to any one of additions 1 to 4, further comprising a means that determines whether each of a plurality of pixel groups has a high frequency component.

(Addition 6)

The motion vector estimation device according to any one of additions 1 to 5, wherein the repetitive calculations are repetitive calculations for minimizing an energy function that is used to estimate the motion vector and that includes a data term and a regularizing term.

(Addition 7)

An interlace-progressive conversion device comprising:
the motion vector estimation device according to any one of additions 1 to 6, an odd-numbered field image or an even-numbered field image in an interlace image being supplied to the motion vector estimation device as the input image;
a motion compensation means that conducts motion compensation on the odd-numbered field image or the even-numbered field image by using a motion vector estimated by the motion vector estimation device; and
a field combination means that combines the odd-numbered field image or the even-numbered field image subjected to the motion compensation with the other field image.

(Addition 8)

A motion vector estimation method used to estimate a motion vector for each of a plurality of pixel groups included in an input image, each pixel group including at least one pixel, by repetitive calculations,
the motion vector estimation method comprising:
a step of conducting the repetitive calculations intended for pixel groups having a high frequency component among the plurality of pixel groups included in the input image, and then conducting the repetitive calculations intended for pixel groups having no high frequency components among the plurality of pixel groups included in the input image.

(Addition 9)

The motion vector estimation method according to addition 8, further comprising a step of conducting the repetitive calculations intended for pixel groups having no high frequency components among the plurality of pixel groups, and then conducting the repetitive calculations intended for a whole of the plurality of pixel groups.

(Addition 10)

The motion vector estimation method according to addition 8 or 9, further comprising:
a step of generating a primary low resolution image which is lower in resolution than the input image, on the basis of the input image; and
a step of estimating a motion vector for the primary low resolution image, and then estimating a motion vector for the input image by using the motion vector estimated for the primary low resolution image as an initial value.

(Addition 11)

The motion vector estimation method according to addition 10, further comprising:
a step of generating a secondary low resolution image which is lower in resolution than the primary low resolution image, on the basis of the primary low resolution image; and
a step of estimating a motion vector for the secondary low resolution image, and then estimating a motion vector for the primary low resolution image by using the motion vector estimated for the secondary low resolution image as an initial value.

(Addition 12)

The motion vector estimation method according to any one of additions 8 to 11, further comprising a step of determining whether each of a plurality of pixel groups has a high frequency component.

(Addition 13)

The motion vector estimation method according to any one of additions 8 to 12, wherein the repetitive calculations are repetitive calculations for minimizing an energy function that is used to estimate the motion vector and that includes a data term and a regularizing term.

(Addition 14)

An interlace-progressive conversion method comprising:
the steps in the motion vector estimation method according to any one of additions 8 to 13, an odd-numbered field image or an even-numbered field image in an interlace image being supplied to the motion vector estimation method as the input image;
a motion compensation step of conducting motion compensation on the odd-numbered field image or the even-numbered field image by using a motion vector estimated in the motion vector estimation method; and
a field combination step of combining the odd-numbered field image or the even-numbered field image subjected to the motion compensation with the other field image.

(Addition 15)

A motion vector estimation program for causing a computer to function as a motion vector estimation device that estimates a motion vector for each of a plurality of pixel groups included in an input image, each pixel group including at least one pixel, by repetitive calculations,
the motion vector estimation program causing the computer to function as a means that conducts the repetitive calculations intended for pixel groups having a high frequency component among the plurality of pixel groups included in the input image, and then conducts the repetitive calculations intended for pixel groups having no high frequency components among the plurality of pixel groups included in the input image.

(Addition 16)

The motion vector estimation program according to addition 15, for further causing a computer to function as a means that conducts the repetitive calculations intended for pixel groups having no high frequency components among the plurality of pixel groups, and then conducts the repetitive calculations intended for a whole of the plurality of pixel groups.

(Addition 17)

The motion vector estimation program according to addition 15 or 16, for further causing a computer to function as:
a means that generates a primary low resolution image which is lower in resolution than the input image, on the basis of the input image; and
a means that estimates a motion vector for the primary low resolution image, and then estimates a motion vector for the input image by using the motion vector estimated for the primary low resolution image as an initial value.

(Addition 18)

The motion vector estimation program according to addition 17, for further causing a computer to function as:
a means that generates a secondary low resolution image which is lower in resolution than the primary low resolution image, on the basis of the primary low resolution image; and
a means that estimates a motion vector for the secondary low resolution image, and then estimates a motion vector for the primary low resolution image by using the motion vector estimated for the secondary low resolution image as an initial value.

(Addition 19)

The motion vector estimation program according to any one of additions 15 to 18, for further causing a computer to function as a means that determines whether each of a plurality of pixel groups has a high frequency component.

(Addition 20)

The motion vector estimation program according to any one of additions 15 to 19, wherein the repetitive calculations are repetitive calculations for minimizing an energy function that is used to estimate the motion vector and that includes a data term and a regularizing term.

(Addition 21)

An interlace-progressive conversion program for causing a computer to function as an interlace-progressive conversion device, the interlace-progressive conversion program causing the computer to function as:
means in the motion vector estimation device according to any one of additions 1 to 6, an odd-numbered field image or an even-numbered field image in an interlace image being supplied to the motion vector estimation device as the input image;
a motion compensation means that conducts motion compensation on the odd-numbered field image or the even-numbered field image by using a motion vector estimated by the motion vector estimation device; and
a field combination means that combines the odd-numbered field image or the even-numbered field image subjected to the motion compensation with the other field image.

The present application is based upon Japanese Patent Application No. 2011-249679 (filed on Nov. 15, 2011), or claims priority based upon Japanese Patent Application No. 2011-249679 according to the Treaty of Paris. Contents disclosed in Japanese Patent Application No. 2011-249679 are incorporated in the present specification by referring to Japanese Patent Application No. 2011-249679.

Representative embodiments of the present invention have been described in detail. It is to be understood that various changes, substitutions, and alternatives can be made without departing from the spirit and scopes of the invention defined in claims. Furthermore, the inventors intend that equivalent scope of the claimed invention is maintained even if claims are corrected in application procedures.

INDUSTRIAL APPLICABILITY

The motion vector estimation device, motion vector estimation method, and motion vector estimation program according to the present invention are industrially useful, because a motion vector can be estimated with less calculation quantity.

REFERENCE SIGNS LIST 101, 101B Motion vector estimation device
103, 103B High frequency/low frequency decision unit
105, 105B Number of times of repetition determination unit
107, 107B Partial differential coefficient calculation unit
109, 109B Motion vector estimation unit
111 Resolution pyramid creation unit
113 Motion vector upscaling unit

What is claimed is:

1. A motion vector estimation device that estimates a motion vector for each of a plurality of pixel groups included in an input image, each pixel group including at least one pixel, by repetitive calculations,
the motion vector estimation device comprising:
a unit configured to conduct the repetitive calculations intended for pixel groups having a high frequency component among the plurality of pixel groups included in the input image, and then conduct the repetitive calculations intended for pixel groups having no high frequency components among the plurality of pixel groups included in the input image.

2. The motion vector estimation device according to claim 1, further comprising a unit configured to conduct the repetitive calculations intended for pixel groups having no high frequency components among the plurality of pixel groups, and then conduct the repetitive calculations intended for a whole of the plurality of pixel groups.

3. The motion vector estimation device according to claim 1, further comprising:
a unit configured to generate a primary low resolution image which is lower in resolution than the input image, on the basis of the input image; and
a unit configured to estimate a motion vector for the primary low resolution image, and then estimates a motion vector for the input image by using the motion vector estimated for the primary low resolution image as an initial value.

4. The motion vector estimation device according to claim 3, further comprising:
a unit configured to generate a secondary low resolution image which is lower in resolution than the primary low resolution image, on the basis of the primary low resolution image; and
a unit configured to estimate a motion vector for the secondary low resolution image, and then estimates a motion vector for the primary low resolution image by using the motion vector estimated for the secondary low resolution image as an initial value.

5. The motion vector estimation device according to claim 1, further comprising a unit configured to determine whether each of a plurality of pixel groups has a high frequency component.

6. The motion vector estimation device according to claim 1, wherein the repetitive calculations are repetitive calculations for minimizing an energy function that is used to estimate the motion vector and that includes a data term and a regularizing term.

7. An interlace-progressive conversion device comprising:
the motion vector estimation device according to claim 1,
an odd-numbered field image or an even-numbered field image in an interlace image being supplied to the motion vector estimation device as the input image;
a motion compensation unit configured to conduct motion compensation on the odd-numbered field image or the even-numbered field image by using a motion vector estimated by the motion vector estimation device; and
a field combination unit configured to combine the odd-numbered field image or the even-numbered field image subjected to the motion compensation with the other field image.

8. A motion vector estimation method used to estimate a motion vector for each of a plurality of pixel groups included in an input image, each pixel group including at least one pixel, by repetitive calculations,
the motion vector estimation method comprising:
a step of conducting the repetitive calculations intended for pixel groups having a high frequency component among the plurality of pixel groups included in the input image, and then conducting the repetitive calculations intended for pixel groups having no high frequency components among the plurality of pixel groups included in the input image.

9. The motion vector estimation method according to claim 8, further comprising a step of conducting the repetitive calculations intended for pixel groups having no high frequency components among the plurality of pixel groups, and then conducting the repetitive calculations intended for a whole of the plurality of pixel groups.

10. The motion vector estimation method according to claim 8, further comprising:
a step of generating a primary low resolution image which is lower in resolution than the input image, on the basis of the input image; and
a step of estimating a motion vector for the primary low resolution image, and then estimating a motion vector for the input image by using the motion vector estimated for the primary low resolution image as an initial value.

11. The motion vector estimation method according to claim 10, further comprising:
a step of generating a secondary low resolution image which is lower in resolution than the primary low resolution image, on the basis of the primary low resolution image; and
a step of estimating a motion vector for the secondary low resolution image, and then estimating a motion vector for the primary low resolution image by using the motion vector estimated for the secondary low resolution image as an initial value.

12. The motion vector estimation method according to claim 8, further comprising a step of determining whether each of a plurality of pixel groups has a high frequency component.

13. The motion vector estimation method according to claim 8, wherein the repetitive calculations are repetitive calculations for minimizing an energy function that is used to estimate the motion vector and that includes a data term and a regularizing term.

14. An interlace-progressive conversion method comprising:
the steps in the motion vector estimation method according to claim 8, an odd-numbered field image or an even-numbered field image in an interlace image being supplied to the motion vector estimation method as the input image;

a motion compensation step of conducting motion compensation on the odd-numbered field image or the even-numbered field image by using a motion vector estimated in the motion vector estimation method; and a field combination step of combining the odd-numbered field image or the even-numbered field image subjected to the motion compensation with the other field image.

15. A non-transitory computer readable medium storing a motion vector estimation program for causing a computer to function as a motion vector estimation device that estimates a motion vector for each of a plurality of pixel groups included in an input image, each pixel group including at least one pixel, by repetitive calculations, the motion vector estimation program causing the computer to function as a unit configured to conduct the repetitive calculations intended for pixel groups having a high frequency component among the plurality of pixel groups included in the input image, and then conduct the repetitive calculations intended for pixel groups having no high frequency components among the plurality of pixel groups included in the input image.

16. The non-transitory computer readable medium storing the motion vector estimation program according to claim 15, for further causing a computer to function as a unit configured to conduct the repetitive calculations intended for pixel groups having no high frequency components among the plurality of pixel groups, and then conduct the repetitive calculations intended for a whole of the plurality of pixel groups.

17. The non-transitory computer readable medium storing the motion vector estimation program according to claim 15, for further causing a computer to function as:

a unit configured to generate a primary low resolution image which is lower in resolution than the input image, on the basis of the input image; and a unit configured to estimate a motion vector for the primary low resolution image, and then estimates a motion vector for the input image by using the motion vector estimated for the primary low resolution image as an initial value.

18. The non-transitory computer readable medium storing the motion vector estimation program according to claim 17, for further causing a computer to function as:

a unit configured to generate a secondary low resolution image which is lower in resolution than the primary low resolution image, on the basis of the primary low resolution image; and a unit configured to estimate a motion vector for the secondary low resolution image, and then estimates a motion vector for the primary low resolution image by using the motion vector estimated for the secondary low resolution image as an initial value.

19. The non-transitory computer readable medium storing the motion vector estimation program according to claim 15, for further causing a computer to function as a unit configured to determine whether each of a plurality of pixel groups has a high frequency component.

20. The non-transitory computer readable medium storing the motion vector estimation program according to claim 15, wherein the repetitive calculations are repetitive calculations for minimizing an energy function that is used to estimate the motion vector and that includes a data term and a regularizing term.

* * * * *